June 11, 1946.                    J. A. ZUBLIN                    2,402,003
                FLEXIBLE PIPE SECTION AND COUPLING THEREFOR
                          Filed Nov. 3, 1944

Inventor
John A. Zublin
By James P. Burns
Attorney

Patented June 11, 1946

2,402,003

UNITED STATES PATENT OFFICE 2,402,003

FLEXIBLE PIPE SECTION AND COUPLING THEREFOR

John A. Zublin, Los Angeles, Calif.

Application November 3, 1944, Serial No. 561,732

3 Claims. (Cl. 138—64)

The present invention relates to an improved flexible pipe section and coupling therefor, primarily adapted for use in a drill string for drilling wells.

A procedure and apparatus for drilling lateral bores deviating from existing well bores are disclosed in U. S. Patent No. 2,336,338, heretofore issued to me. It has been found highly desirable in the drilling of lateral bores to employ a turbine driven bit, such for example as disclosed in U. S. Patent No. 2,336,336, carried at the lower end of the drill string. It is likewise expedient to drive the turbine at high speeds, necessitating the employment of liquid pressures varying, for example, between 200 and 1,000 pounds per square inch in the flexible tubular drill string.

In order to carry the high pressure fluid medium for actuating the turbine, lubricating the bit, and carrying the detritus, it is necessary to provide an imperforate flexible lining within the resilient flexible metal tube, as well as appropriate couple means for interconnecting separate pipe sections.

It is a primary object of the present invention to provide an improved flexible pipe section and coupling therefor, which will preclude leakage of the high pressure fluid from the drill string.

It is a more specific object of the invention to provide a flexible pipe section embracing an imperforate flexible lining secured to the resilient flexible metal tube adjacent the ends thereof, over an area adequate to create an effective hermetic seal.

It is a further and more specific object of the invention to provide complemental coupling members, one adapted to be carried at each end of the flexible pipe section for interconnecting the flexible pipe section to other sections of a drill string, and to employ the complemental coupling members to further ensure an effective hermetic seal between the resilient flexible metal tube and the flexible lining therefor.

Other and more specific objects of the invention will appear in the course of the following description, in which reference will be made to the accompanying drawing forming a part hereof and in which.

Figure 1:
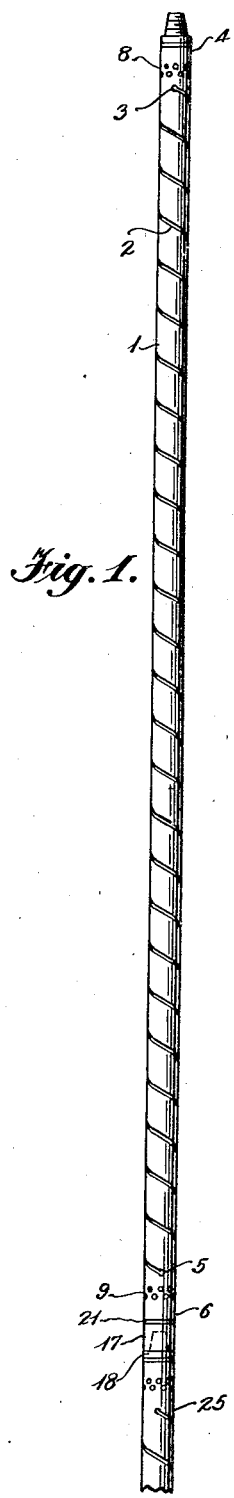
Fig. 1 is a side-elevational view of a flexible pipe section and coupling therefor conforming to the invention.

Referring to Fig. 1, the resilient flexible metal tube of the flexible pipe section is indicated generally by the reference numeral 1. In this embodiment a helical slot 2 extends from a point 3 somewhat removed from the end 4 of the resilient flexible tube 1 to a point 5 somewhat removed from the opposite end 6 of the tube 1.

It will be understood that the slotted tube 1 is both flexible and resilient, and is adapted to partake of considerable curvature in use.

Figure 2:
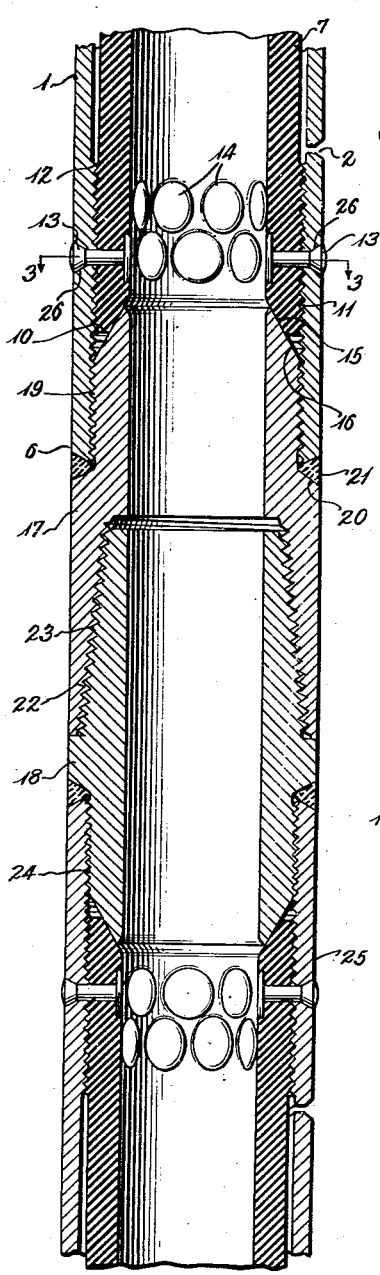
Fig. 2 is an enlarged cross-sectional view through the ends of adjacent flexible pipe sections showing the complemental coupling members employed to interconnect such sections.

An imperforate lining in the form of a hose 7 (Fig. 2) completely bridges the area of the tube 1 between the ends of the helical slot 2 and extends into the ends of the tube 1 beyond the slotted portion thereof. The flexible hose 7 is interconnected to the metal tube 1 beyond the limits of the slotted portion of the tube 1, as indicated generally at 8 and 9 in Fig. 1. The flexible hose 7 terminates as shown in Fig. 2 at the point 10, well within the end 6 of the metal tube 1. The metal tube 1 is internally threaded at each end as indicated at 11, and the threads 11 extend well into the inner end of the metal tube 1 to the point 12, so that the ends of the flexible hose 7 overlap a substantial portion of the internally threaded area of the tube 1 at each end thereof. It is through this overlapping area of the threaded portion of the metal tube 1 and the flexible hose 7 that the same are interlocked to provide an effective hermetic seal.

Figure 3:
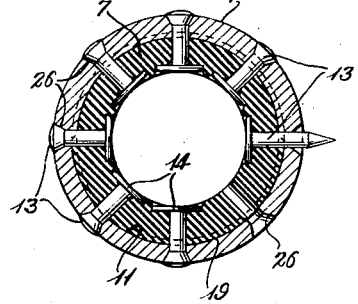
Fig. 3 is a detailed view of the interlocking means taken on the line 3—3 of Fig. 2 showing one of the rivets removed and another prior to peening.

The interlocking is accomplished in the exemplified embodiment through the medium of two rows of staggered large headed rivets 13. The large heads of these rivets 14 are positioned on the inside of the flexible hose 7 and the shanks of the rivets extend through the flexible hose 7 into the countersunk openings 26 in the metal tube 1, into which the free ends of the rivets are peened, while the heads 14 thereof are forced outwardly under tremendous pressure by a suitable slightly tapered mandrel. The riveting operation causes the internal threads 11 of the tube 1 to embed themselves in the outer wall of the hose 7. The large staggered heads 14 of the rivets 13 substantially completely cover the major portion of the overlapping area between the flexible hose 7 and the metal tube 1, and effectively interlock the flexible hose 7 and the metal tube 1 throughout an area adequate to ensure an effective hermetic seal (see Fig. 3).

To further augment the effective hermetic seal between the flexible hose 7 and the metal tube 1, the ends of the hose 7 are beveled as shown at 15, and are adapted to be expanded at the extreme end into contact with the tube 1 by the complemental bevel 16 of each of the complemental coupling members 17 and 18. The female coupling member 17 is externally threaded at 19 and is adapted to be received by the internal threads 11 in that portion of the interiorly threaded end of the metal tube 1, which does not overlap with the flexible hose 7. When the female coupling 17 is tightened into position in the end of the metal tube 1, the bevel portion 16 thereof is adapted to contact the bevel portion 15 of the flexible hose 7 and, as above described, expand the same into tight contact with the metal tube 1.

To further ensure the provision of a hermetic seal between the metal tube 1 and the female coupling member 17, an annular groove 20 between these elements may be provided which can be conveniently filled with a circular welded ring 21. The female coupling member 17 is internally threaded at 22 to receive the complemental threaded portion 23 of the male coupling 18, which is also threaded at 24 to be received in the end of a second resilient metal tube 25, in all respects the same as the metal tube 1.

It will be appreciated that the flexible hose 7 is interlocked to the metal tube 1 at the end 4 thereof, in the same manner as above described with respect to the interlocking of these elements at the end 6 of the tube 1, with the single exception that at the end 4 the flexible tube 1 receives a complemental male member of the coupling, in all respects the same as the male member 18 shown in Fig. 2.

From the foregoing, it will be noted that the invention provides a hermetic seal between the flexible rubber hose and the resilient flexible metal tube, which does not reduce the internal diameter of the hose, nor increase the outside diameter of the metal tube. It will additionally be noted that the invention provides a coupling between the flexible pipe section which is not cured to the rubber of the rubber hose, and which when in position in a drill string lies flush with both the outside diameter of the flexible pipe section and the inside diameter of the flexible imperforate lining. There is thus provided an effective and simple flexible pipe section and coupling therefor, adapted to carry fluids under extremely high pressure, possessed of long life, and capable of economic production.

Having thus described my invention what I claim is:

1. A flexible pipe section comprising a resilient metal tube slotted intermediate its ends to impart flexibility thereto, an imperforate flexible lining within said tube bridging the slotted portion thereof, interlocking elements extending through said lining and tube over an area adequate to create a hermetic seal adjacent each end thereof.

2. A flexible pipe section comprising a resilient metal tube slotted intermediate its ends to impart flexibility thereto, an imperforate flexible lining within said tube bridging the slotted portion thereof, interlocking elements extending through said lining and tube over an area adequate to create a hermetic seal adjacent each end thereof, said metal tube extending at its ends beyond said flexible lining, said extensions being internally threaded to receive complemental members of a pipe coupling.

3. A flexible pipe section comprising a resilient metal tube slotted intermediate its ends to impart flexibility thereto, an imperforate flexible lining within said tube bridging the slotted portion thereof, interlocking elements extending through said lining and tube over an area adequate to create a hermetic seal adjacent each end thereof, said metal tube extending at its ends beyond said flexible lining, said extensions being internally threaded to receive complemental members of a pipe coupling, a complemental member of the pipe coupling mounted in the threaded extension at each end of said metal tube, the inner ends of said complemental coupling members serving to expand the free ends of said imperforate flexible lining into liquid-tight contact with the interior wall of said resilient metal tube.

JOHN A. ZUBLIN.